United States Patent [19]
Yoshioka et al.

[11] 3,946,290
[45] Mar. 23, 1976

[54] HIGH TENSION CERAMIC CONDENSER

[75] Inventors: Tsunehiko Yoshioka; Yasutaka Oyamada; Shoichi Iwaya; Minoru Sato, all of Tokyo, Japan

[73] Assignee: TDK Electronics Co. Ltd., Tokyo, Japan

[22] Filed: Aug. 9, 1974

[21] Appl. No.: 496,313

[30] Foreign Application Priority Data
Oct. 9, 1973 Japan............................ 48-113564
Dec. 3, 1973 Japan............................ 48-134265
Feb. 18, 1974 Japan............................ 49-18465

[52] U.S. Cl.............................. 317/258; 317/247
[51] Int. Cl.² ........................................ H01G 1/14
[58] Field of Search ........... 317/261, 258, 242, 247

[56] References Cited
UNITED STATES PATENTS
| | | | |
|---|---|---|---|
| 2,031,846 | 2/1936 | Muth | 317/258 X |
| 2,373,098 | 4/1945 | Brennan | 317/258 |
| 2,895,093 | 7/1959 | Kodama | 317/261 X |
| 3,586,934 | 6/1971 | Nakata | 317/261 |

Primary Examiner—E. A. Goldberg
Attorney, Agent, or Firm—Oblon, Fisher, Spivak, McClelland & Maier

[57] ABSTRACT

An improved high voltage ceramic capacitor is disclosed which includes a ceramic body having electrode layers formed on opposite sides thereof. Novel terminals formed of material having a coefficient of expansion which is the same as, or nearly the same as, the material of the ceramic body are bonded to the electrode layers to prevent voids resulting from thermal stresses.

10 Claims, 11 Drawing Figures

1 CYCLE (4 hr)

HIGH TENSION CERAMIC CONDENSER

BACKGROUND OF THE INVENTION

1. Field of the Invention

The present invention relates to a high tension ceramic condenser, and especially to an improved high tension ceramic condenser which has an excellent cooling-heating cycle characteristic.

2. Description of Prior Art

Recently, gas circuit breakers having a capacity for handling extra-high voltages and which contain $SF_6$ gas as an extinction medium have been developed as high power circuit breakers, whereby a need has been created for high tension ceramic condensers of improved reliability to be contained in the gas breakers.

As shown in FIG. 1, the electrode terminal for a conventional high tension ceramic condenser is formed as follows. An electrode layer 2 is formed on each of the parallel surfaces of a ceramic dielectric body 1 formed of barium titanate etc., by printing with a molten metal such as silver or a mixture of silver oxide and frit, or by chemically plating nickel. A metal terminal 3 having a screw made of brass is welded or bonded with a solder 4 or an electroconductive adhesive to the electrode layer 2. All parts except the edge of the terminal are encased with a moulded synthetic resin 5.

In the described structure of the conventional ceramic condenser, the metal terminal is made of brass which is easily machined. However, the brass has an expansion coefficient of $20 - 23 \times 10^{-6}$/deg, while the ceramic dielectric has an expansion coefficient of $7 - 9 \times 10^{-6}$/deg, whereby the coefficient of expansion of brass is about 2 – 3 times of that of ceramic dielectric. Accordingly, in soldering the metal terminal, a residual compressive stress which tends to contract the material toward its center is formed in the electrode layer and in the solder layer between the ceramic dielectric and the metal terminal during the cooling period when the temperature drops from the melting point of solder to room temperature.

Furthermore, when ceramic condensers are tested by the conventional cooling-heating cycle test at temperatures ranging from −30°C to 90°C, stresses due to the cooling-heating cycle are added to the residual stress existing at room temperature. Accordingly, the difference in expansion coefficients is large and the contraction coefficient, corresponding to the increased residual stress, increases at the interface between the electrode layer and the solder layer. This increase in the contraction coefficient causes a peeling phenomenon to occur so as to form a void.

FIG. 2 illustrates the formation of a void by the described phenomenon. When the cooling-heating cycle test is performed on a ceramic condenser, the compressive stress corresponding to the deviation between the expansion coefficient and the contraction coefficient at low temperatures is added to the residual compressive stress. Accordingly, as shown in FIG. 2, a void 6 is caused by the peeling phenomenon at the interface between the ceramic dielectric 1 and a portion of the metal terminal of the electrode 2. As shown in FIG. 3, the void is equivalent to connecting an air condenser having a small capacity $Cc$ in series with electrostatic capacity $Cs$ of the ceramic dielectric. When a voltage $E(V)$ is applied, the voltage $$(Cs/Cc + Cs) \times E \ (V)$$

is applied to the capacitor $Cc$. As $Cc << Cs$, most of the applied voltage is partially applied to $Cc$. However, the insulation of the small void condenser is quite low whereby a partial discharge is caused upon applying a low voltage, and an apparent corona starting voltage is created as the high tension ceramic condenser is caused to decrease. Accordingly, the reliability of the associated circuit breaker may sometimes be decreased quite seriously because of the described deterioration in the characteristics of the conventional high tension ceramic condenser.

SUMMARY OF THE INVENTION

Accordingly, it is an object of the present invention to overcome the described disadvantages in conventional condenser technology.

It is another object of the present invention to provide a high tension ceramic condenser having high reliability due to the prevention of the peeling phenomenon at the interface between the electrode layer and the ceramic dielectric during soldering by using an electrode terminal which is a ceramic having a metal conductive layer coated on a surface of the ceramic so that the coated terminal has an expansion coefficient similar to the expansion coefficient of the ceramic dielectric.

Briefly, these and other objects of the invention are provided in the structure of a high tension ceramic condenser by bonding a ceramic electrode terminal to the electrode layer formed on parallel smooth surfaces of the ceramic dielectric plate. A metal terminal is bonded to the ceramic electrode terminal and all parts, except a portion of the metal terminal, are encapsulated with a synthetic resin. Accordingly, the deterioration due to the peeling phenomenon at the interface between the electrode layer and the ceramic dielectric is effectively prevented during the soldering of the terminal and during the cooling-heating test cycle. In another embodiment, only a side portion of the electrode and a side portion of the magnetic dielectric are coated with the synthetic resin. In yet another embodiment, iron or an iron alloy such as nickel steel, which has a linear expansion coefficient which is the same as or similar to that of the ceramic dielectric, is used as the electrode terminal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
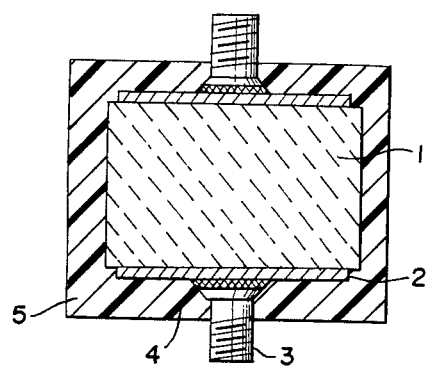
FIG. 1 is a sectional view of the conventional high tension ceramic condenser.
Figure 2:
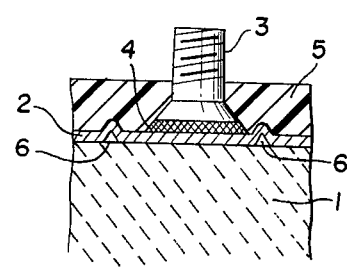
FIG. 2 is a schematic view showing contraction stress on an electrode and a solder joint void caused by a cooling-heating cycle test.
Figure 3:
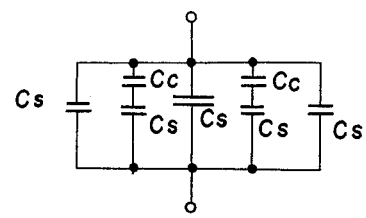
FIG. 3 is an equivalent circuit including a small capacitance representing the phenomenon of FIG. 2.
Figure 4:
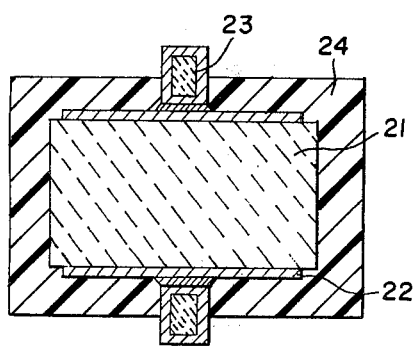
FIG. 4 is a sectional view of one embodiment of the high tension ceramic condenser of the present invention.
Figure 7:
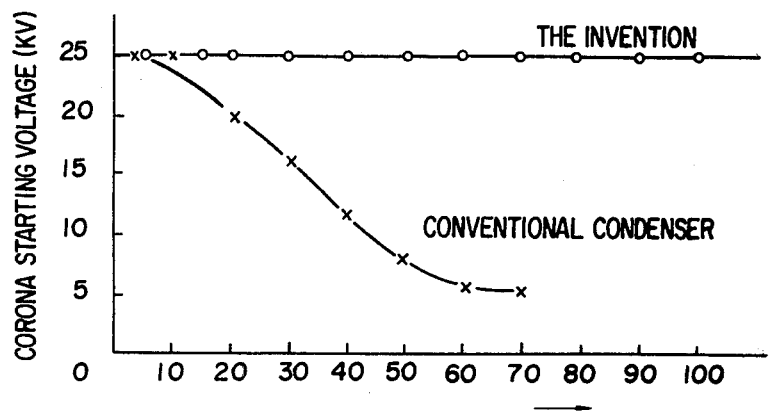
FIG. 7 is a graph of characteristics of AC corona starting voltage (KV) versus the number of cycles.

Referring now to the drawings, wherein like reference numerals designate identical or corresponding parts throughout the several views, and more particularly to FIG. 4 thereof, the reference numeral 21 designates a ceramic dielectric and 22 designates an electrode layer prepared by printing molten metal silver or a mixture of silver oxide and frit, or by chemically plating nickel on each of the parallel surfaces of the ceramic dielectric. The numeral 23 designates a ceramic terminal made of ceramic having an expansion coefficient similar to that of the ceramic dielectric 1. The ceramic terminal is coated with a conductive metal and soldered or bonded on the electrode layer. All parts except the edge of the ceramic terminal are moulded or encased in a synthetic resin 24. It is preferable to uniformly blend a filler such as $SiO_2$, $Al_2O_3$, etc. into the synthetic resin. The expansion coefficient of the ceramic terminal is quite similar to that of the ceramic dielectric in comparison with that of the conventional terminal, whereby residual compressive stress is not significantly produced in the interface between the electrode layer and the ceramic dielectric during the time when the solder cools from a liquid to a solid state during the soldering process. Accordingly, additional compressive stresses are also prevented during the temperature fluctuations caused by the cooling-heating cycle test. For example, in the cooling-heating cycle test (+90°C ~ −30°C) as shown in FIG. 7, the corona starting voltage of the ceramic condenser is decreased remarkably as the number of cooling-heating cycles is increased.

One embodiment of the ceramic condenser of the present invention will now be described in more detail. $SrTiO_3$—$Bi_2O_3 \cdot 3TiO_2$—$BaTiO_3$ type and $BaTiO_3$—$Bi_2(SnO_3)_3$—$La_2O$ type ceramics are selected as the material of the ceramic dielectric. The linear expansion coefficient $\beta$ is $8.47 \times 10^{-6}$/deg for the former ceramic and $7.53 \times 10^{-6}$/deg for the latter type. The cubic expansion coefficient $\alpha$ is $3\beta$.

$Al_2O_3$ is selected as the material of the ceramic terminal and the surface of the ceramic terminal is coated with a conductive membrane to form the structure of FIG. 4. The linear expansion coefficient $\beta'$ of $Al_2O_3$ is $7.3 - 7.6 \times 10^{-6}$/deg which is similar to the linear expansion coefficient of the ceramic dielectric. Accordingly, a decrease in the corona starting voltage does not occur in the cooling-heating cycle test. Nor is the below mentioned capacity change coefficient found.

Figure 8:
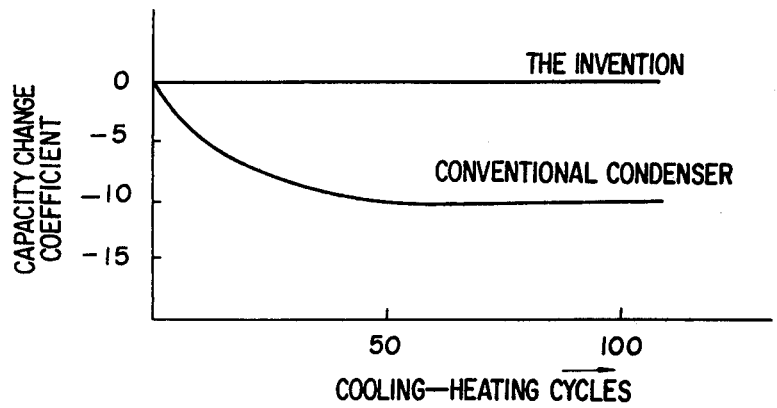
FIG. 8 is a graph of characteristics of a capacity change coefficient versus the number of cycles.

FIG. 8 shows the capacity change characteristic of the described embodiment of the invention. The ceramic dielectric is selected from the above-mentioned types of ceramics and the ceramic terminal is made of $Al_2O_3$ or a ceramic used as the ceramic dielectric 23 is coated with a conductive membrane and soldered on the electrode as shown in FIG. 4. In the cooling-heating cycle test, the capacity of the ceramic condenser of the invention is not substantially changed. In contrast the capacity of the condenser in which a metal terminal 3 is soldered on the electrode is remarkably changed. The characteristics are shown in FIG. 8.

Figure 5:
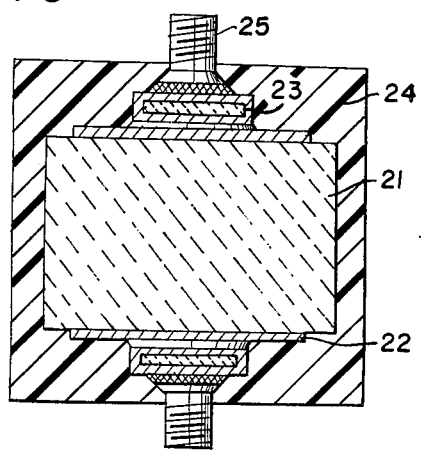
FIG. 5 is a sectional view of another embodiment of the present invention.
Figure 6:
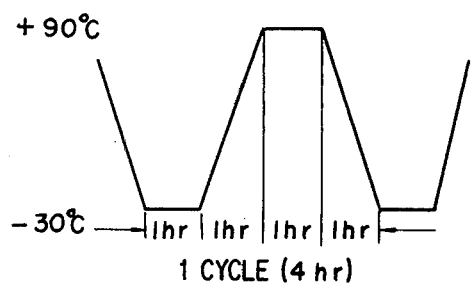
FIG. 6 is a diagram of the cooling-heating cycle test.

FIG. 5 shows another embodiment of the ceramic condenser of the invention, wherein a metal terminal 25 is used, and which is thus different from the embodiment of FIG. 4. In FIG. 5, the thin ceramic terminal 23 is soldered on the electrode layer 22 formed on each of the parallel surfaces of the ceramic dielectric 21 and the metal terminal 25 is soldered on the ceramic terminal 23. In this embodiment, a complicated terminal structure can be easily formed and significant manufacturing advantages are thus provided. The characteristics and effect of the structure are substantially the same as those of the structure shown in FIG. 4. As stated above, in accordance with the ceramic condenser of the invention, the ceramic terminal coated with a metal conductive layer on the ceramic having an expansion coefficient which is the same as or similar to the expansion coefficient of the ceramic dielectric, is soldered on the electrode layer formed on each of the parallel surfaces of the ceramic dielectric and all parts except an edge of the terminal are encapsulated with a synthetic resin, or a metal terminal is soldered on the ceramic terminal and all parts except an edge of the metal terminal are encapsulated with the synthetic resin.

Accordingly, in the soldering of the ceramic terminal coated with a conductive membrane on the electrode layer of the ceramic dielectric or in the cooling-heating cycle test, there is no formation of a void caused by the phenomenon of peeling at the interface between the electrode layer and the ceramic dielectric. Thus it is possible to provide a high tension ceramic condenser having high reliability and having no decrease in corona starting voltage and no change in capacity.

According to the results of the tests, the optimum characteristics are imparted when the material of the ceramic electrode is the same as that of the ceramic dielectric. As stated above, the ceramic condenser of the invention is quite effective in practical applications as it improves the reliability of various types of electrical equipment, especially circuit breakers.

Figure 9:
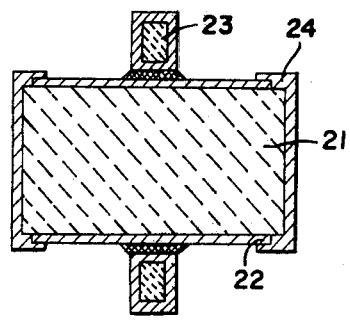
FIGS. 9 and 10 are sectional views of another embodiment of the high tension ceramic condenser of the present invention.
Figure 10:
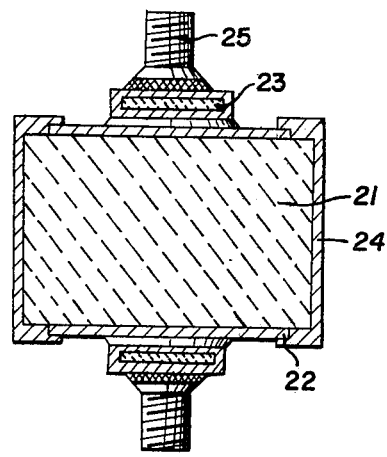

In the described embodiments, all parts except the edge of the terminal are encapsulated with the synthetic resin. However, the same effects of high reliability, no decrease in corona starting voltage, and no change in capacity can be achieved by the structure shown in FIGS. 9 and 10 wherein only the side or lateral surface of the ceramic dielectric and peripheral part of the electrode layer are coated with the synthetic resin. The coating of these special parts can be carried out easily in comparison with the encapsulation in the former embodiments. Since the expansion coefficient of the ceramic terminal is the same as or similar to that of the ceramic dielectric, the electrode layer is not deformed by cooling or heating even though the central part of the electrode layer is not encapsulated.

Figure 11:
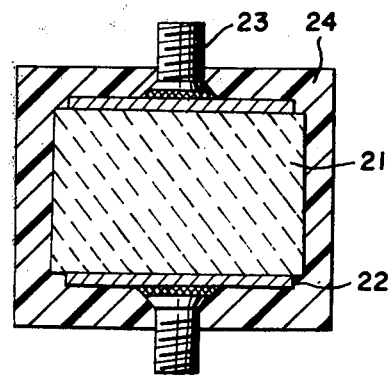
FIG. 11 is a sectional view of another embodiment of the high tension ceramic condenser of the present invention.

The described embodiments, a ceramic terminal having an expansion coefficient which is the same as or similar to that of the ceramic dielectric is used under a coating formed of a conductive membrane. However, the same effects of high reliability, no decrease in corona starting voltage and no change in capacity are provided by using a terminal made of iron or an alloy such as nickel-iron alloy which has a linear expansion coefficient which is the same as or similar to that of the ceramic dielectric which is $7 - 12 \times 10^{-6}$/deg, as shown in FIG. 11. The terminal 23 made of nickel-iron alloy having a linear expansion coefficient of $7.9 \times 10^{-6}$/deg is soldered on the electrode layer 22 formed on the ceramic dielectric 21. All parts except the edge of the terminal are encapsulated with the synthetic resin.

Obviously, numerous additional modifications and variations of the present invention are possible in light of the above teachings. It is therefore to be understood that within the scope of the appended claims, the invention may be practiced otherwise than as specifically described herein.

What is claimed is:

1. A high tension ceramic condenser comprising:
   a ceramic dielectric having two parallel surfaces;
   an electrode layer formed on each of said parallel surfaces of said ceramic dielectric;
   a terminal separate from the electrode layer having an expansion coefficient which is substantially the same as the expansion coefficient of said ceramic dielectric, said terminal being joined by solder or an electroconductive adhesive to at least one of said electrode layers; and,
   a synthetic resin covering at least part of said electrode layers.

2. A high tension ceramic condenser saccording to claim 1 wherein:
   said terminal is made of a ceramic having an expansion coefficient which is substantially the same as that of said ceramic dielectric and wherein said terminal is coated with a layer of conductive material.

3. A high tension ceramic condenser according to claim 1 wherein:
   said terminal is made of iron having an expansion coefficient which is substantially the same as that of said ceramic dielectric.

4. A high tension ceramic condenser according to claim 1 wherein:
   said terminal is made of an iron alloy having an expansion coefficient which is substantially the same as that of said ceramic dielectric.

5. A high tension ceramic condenser according to claim 1, wherein:
   all parts except edge portions of said terminals are encapsulated with a synthetic resin.

6. A high tension ceramic condenser according to claim 1, wherein:
   at least peripheral parts of said electrode layers and a side surface of said ceramic dielectric are coated with a synthetic resin.

7. A high tension ceramic condenser according to claim 1, wherein:
   said ceramic dielectric is made of $SrTiO_3$—$Bi_2O_3 \cdot 3TiO_2$—$BaTiO_3$ type ceramic.

8. A high tension ceramic condenser according to claim 1, wherein:
   said ceramic dielectric is made of $BaTiO_3$—$Bi_2(SnO_3)_3$—$La_2O$ type ceramic.

9. A high tension ceramic condenser according to claim 1, wherein:
   said synthetic resin contains a filler of $SiO_2$ or $Al_2O_3$.

10. A high tension ceramic condenser comprising:
    a ceramic dielectric having two parallel surfaces;
    an electrode layer formed on each of said parallel surfaces of said ceramic dielectric;
    a terminal separate from the electrode layer having an expansion coefficient which is substantially the same as the expansion coefficient of said ceramic dielectric, said terminal being joined by solder or an electroconductive adhesive to at least one of said electrode layers;
    a synthetic resin covering at least part of said electrode layers;
    said terminal being made of a ceramic having an expansion coefficient which is substantially the same as that of said ceramic dielectric and said terminal being coated with a layer of conductive material;
    a metal terminal soldered on said ceramic terminal which is in turn bonded to said electrode layer formed on said ceramic dielectric.

* * * * *